July 18, 1961
F. P. PENDLETON
2,992,858
SYSTEM FOR CONVEYING FLUENT MATERIAL
Filed Dec. 2, 1958
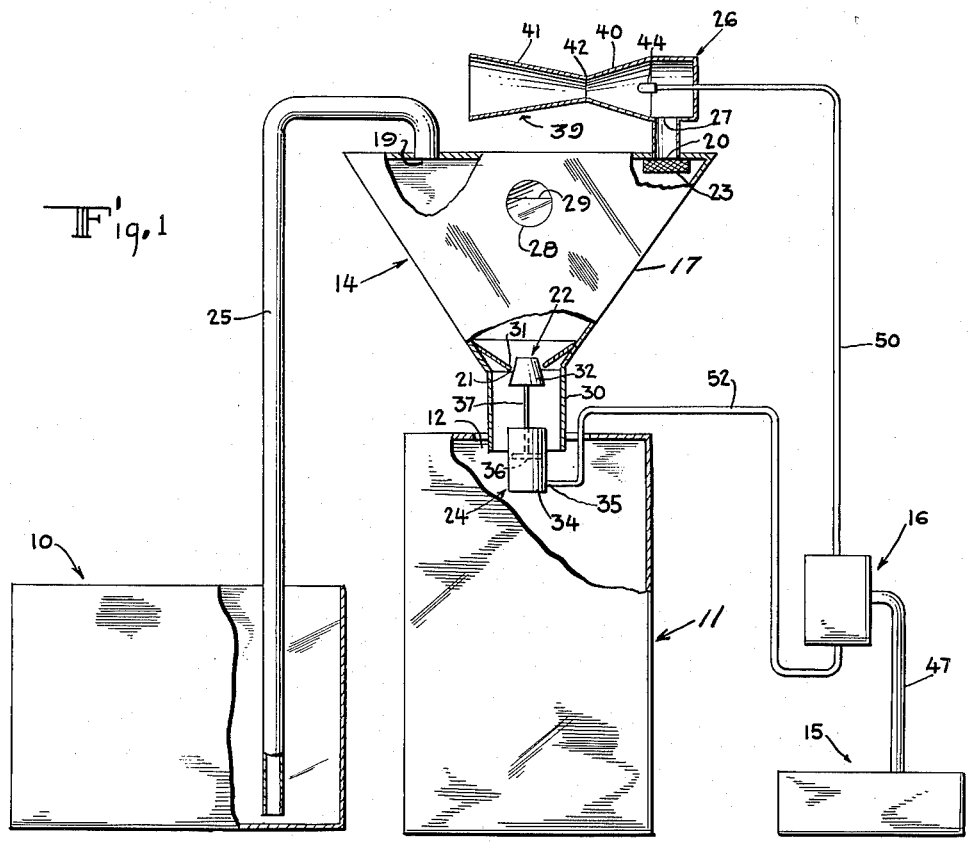
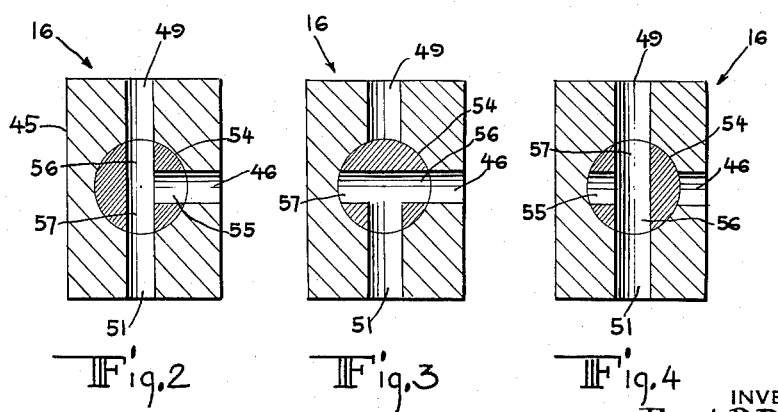
INVENTOR
Frank P. Pendleton
BY
Ernest P. Joensen
ATTORNEY United States Patent Office 2,992,858
Patented July 18, 1961

2,992,858
SYSTEM FOR CONVEYING FLUENT MATERIAL
Frank P. Pendleton, Montclair, N.J., assignor to Vac-U-Max, Belleville, N.J., a corporation of New Jersey
Filed Dec. 2, 1958, Ser. No. 777,688
6 Claims. (Cl. 302—17)

The present invention relates to a system for conveying fluent material from a storage receptacle to an intermediate receptacle and then to a receptacle for processing the material, and, more particularly, to such a system whereby it is operated and controlled entirely by compressed air.

In carrying out various industrial processes, it is frequently required to supply fluent material from one level to the inlet of a processing receptacle at the same level or a higher or lower level. While numerous types of conveying systems have been devised for so handling fluent materials, such systems have been subject to one or more objections, namely, excessive cost and complicity, explosion hazards because of electrical motors and/or controls, inability to handle both liquid and powder, excessive noise, and lack of provision for measuring batches of fluent material before discharge thereof into the processing receptacle.

Accordingly, an object of the present invention is to provide a system which overcomes all of the foregoing difficulties and objections.

Another object is to provide such a system wherein compressed air is solely relied upon to operate and control the system.

Another object is to provide such a system wherein a batch of fluent material can be placed in an elevated position and retained there until it is desired to discharge the same into the processing receptacle.

Another object is to provide such a system wherein the material is confined while being conveyed and dusting or fuming effects are eliminated.

A further object is to accomplish the foregoing in a practical, reliable and extremely simple and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a system for conveying fluent material from a source at one level to a processing receptacle having an inlet at the same or a higher or lower level which system essentially comprises in combination a closed receptacle such as a hopper having an inlet adjacent its upper end and a discharge outlet at its lower end, a valve for opening and closing the outlet, compressed air operated motor means for closing the valve, a conduit connected to the inlet and extending to the source, compressed air operated means for creating a vacuum having an intake in fluid flow communication with the receptacle to vacuumize the same when the valve is closed and thereby move fluent material through the conduit from the source to the receptacle, means for supplying compressed air to the motor means and the vacuum creating means, and valving for selectively controlling the supply of compressed air to the motor means and the vacuum creating means.

A preferred embodiment of the invention has been chosen for purposes of illustration and description, and is shown in the accompanying drawing, forming a part of the specification, wherein:

FIG. 1 is a schematic view, partly in elevation and partly in section, of a system in accordance with the present invention.

FIGS. 2, 3 and 4 are sectional views of a control valve shown in different positions to introduce material into the receptacle, to retain the material in the receptacle, and to discharge the material from the receptacle.

Referring to the drawing in detail, a system is illustrated which generally comprises a receptacle 10 for storing a source of fluent material, such as liquid or powder, at a lower level; a processing receptacle 11 having an inlet 12 at a higher level; compressed air operated apparatus 14 for elevating the material, retaining the material and discharging the same into the inlet 12; a source of compressed air 15; and valving 16 for controlling the supply of compressed air to the apparatus 14.

The apparatus 14, as illusttrated herein by way of example, comprises a receptacle 17, such as a hopper which is closed, except for an inlet 19 for the material and an air outlet 20 adjacent or at the upper end and a discharge outlet 21 for the material at its lower end; a valve 22 for opening and closing the discharge outlet 21; a compressed air operated motor 24 for closing the valve; a conduit 25 connected to the inlet 19 and extending to adjacent the bottom of the source receptacle 10; and a compressed air operated vacuum creating device 26 mounted on the receptacle 17 and having an intake 27 connected in fluid flow communication with the air outlet 20 of the receptacle 17.

As shown herein, the receptacle 17 may have a sight glass or window 28 having a line 29 thereon which indicates the level to which this receptacle is to be loaded, and may have a tube 30 which extends from the discharge outlet 21 into the inlet 12 of the receptacle 11 to direct the flow of the material from the receptacle 17 to the receptacle 11. If desired, automatic means responsive to the level of the material may be provided for controlling the valving 16.

Preferably, the air leaving the receptacle passes through a filter 23.

The valve 22 may be of the type including a seat 31 defining the discharge outlet and a valve member 32 cooperating with the seat 31 to open and close the discharge outlet by movement in a vertical direction.

The motor 24 may be of the type including a vertical cylinder 34 positioned beneath the discharge outlet 21 having a port 35 adjacent its lower end, a piston 36 in the cylinder, and a rod 37 connecting the piston and valve member 32 whereby the piston controls the movement of the valve member.

The vacuum creating device 26 includes a venturi 39 having an inlet section 40 coupled to the intake 27, an outlet section 41 in communication with the atmosphere and a throat 42 between the inlet and outlet sections; and a nozzle 44 for directing compressed air into the inlet section, whereby suction is created within the intake 27 and the receptacle 17 is vacuumized when the valve 22 is closed to cause material to be conducted from the source receptacle 10 to the inlet of the receptacle 17.

The source of compressed air 15 may be supplied by a line connected to a reservoir filled with compressed air by a compressor.

The valving 16, while illustrated herein as the rotary plug type, may be of any type having three operative positions, namely, to simultaneously supply compressed air to the motor 24 and to the vacuum creating device 26 and thereby effect loading of the receptacle (FIG. 2), to simultaneously maintain the motor 24 effective to close the valve 22 and to render the vacuum creating device 26 ineffective and thereby hold the material in the receptacle 17 (FIG. 3), and to vent the cylinder 34 of the motor to the atmosphere and thereby enable the valve 22 to open and cause the material to be discharged from the receptacle 17 (FIG. 4).

In order to accomplish the foregoing, the valving 16 illustrated herein by way of example comprises a body 45 having a side port 46 connected by a conduit 47 to the source of compressed air, an upper port 49 connected by a conduit 50 to the nozzle 44 and a lower port 51 connected by a conduit 52 to the port 35 of the motor cylinder 34; a plug 54 rotatably mounted in the body 45 having a T-shaped passageway including bores 55, 56 and 57 for communicating with the ports 46, 49 and 51 in the manner about to be described; and suitable manually or automatically, locally or remotely operated means (not shown) for positioning the valving.

In operation of the system after a batch of material has been discharged from the receptacle 17, the valving 16 is in the position as shown in FIG. 4 with the supply of compressed air shut off and the valve 22 in its open position. In order to reload the receptacle 17, the plug 54 preferably is rotated 180° in a counterclockwise direction as viewed so that it passes through an intermediate position (FIG. 3) after 90° of such rotation, whereby the cylinder 34 is pressurized to effect closing of the valve 22, and assumes the position shown in FIG. 2, whereby the cylinder 34 is further pressurized and the vacuum creating device is operated. Material is now conveyed from the source receptacle 10 to the receptacle 17.

When the receptacle 17 has been loaded with the desired quantity of material, the plug is rotated 90° in a clockwise direction as viewed and assumes the position shown in FIG. 3, whereby the vacuum creating device is rendered ineffective and material ceases to be conveyed and the cylinder 34 is maintained pressurized to retain the valve in closed position.

The receptacle 17 in this manner can be loaded before the batch is to be discharged into the processing receptacle 11 and can be so held for any desired length of time or the batch can be discharged immediately. In either case, the material is discharged from the receptacle 17 by rotating the plug 90° in a clockwise direction as viewed to the position shown in FIG. 4, whereby the cylinder is vented to the atmosphere and the valve is caused to open by moving downwardly by reason of the weight of the valve member 32 and the piston 36, the weight of the material acting on the valve member and a spring, if required.

From the foregoing description, it will be seen that the present invention provides a simple, practical, reliable and economical system for elevating fluent material which system by being entirely air operated and controlled has no electrical equipment which by a spark might cause an explosion in the event the material handled is of an explosive nature.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a system for conveying liquid and solid fluent material, the combination of a closed receptacle having a constantly open inlet for fluent material adjacent its upper end and a discharge outlet at its lower end, a valve at the lower end of said receptacle for opening and closing said outlet, compressed air operated motor means for closing said valve, a conduit connected to said inlet adapted to extend into a source of fluent material, compressed air operated means for creating a vacuum having a constantly open intake in fluid flow communication with said receptacle to thereby move fluent material through said conduit from the source to said receptacle when said valve is closed, a supply of compressed air, conduit means for supplying compressed air supply to both said motor means and said vacuum creating means, and simultaneously operable valving for selectively controlling the flow of compressed air from said supply to both said motor means and said vacuum creating means, said valving including means for rendering said vacuum creating means effective only when said valve closing motor means are rendered effective, said receptacle being so constructed and arranged that, when said valve closes said outlet, said inlet and said intake constitute the sole means of fluid flow communication with the interior of said receptacle.

2. In a system according to claim 1, wherein said valving includes means for rendering said valve closing motor means and said vacuum creating means simultaneously effective.

3. In a system according to claim 1, wherein said valving includes means for simultaneously maintaining said valve closing motor means effective and rendering said vacuum creating means ineffective.

4. In a system according to claim 1, wherein said vacuum creating means includes a venturi having a nozzle at its intake connected for fluid flow communication to said valving and having an outlet in communication with the atmosphere, and said valving includes means for shutting off the supply of air to said valve closing motor means and to establish communication between said motor means and said nozzle to thereby vent said motor means and vent the same to cause said valve to open.

5. In a system according to claim 4, wherein said valving includes means for first rendering said valve closing motor means and said vacuum creating means simultaneously effective, and means for next simultaneously maintaining said valve closing motor means effective and rendering said vacuum creating means effective prior to rendering said last mentioned valving means in claim 4 operative.

6. In a system according to claim 4, wherein said valving means are constructed and arranged in being operated to move from the position set forth in claim 4 to a position establishing communication between said compressed air supply and both said valve closing motor means and said vacuum creating means through a position establishing communication between said supply and only said valve closing motor means, whereby said motor means is pressurized to close said valve before said vacuum creating means is rendered effective.

References Cited in the file of this patent

UNITED STATES PATENTS

| | | |
|---|---|---|
| 210,793 | Luckenbach | Dec. 10, 1878 |
| 488,446 | Murray | Dec. 20, 1892 |
| 2,380,651 | Jeffery | July 31, 1945 |
| 2,793,085 | Ellis | May 21, 1957 |